C. HOHL & D. BALDWIN.
UMBRELLA SUPPORTING DEVICE.
APPLICATION FILED NOV. 8, 1913.
1,162,608.
Patented Nov. 30, 1915.
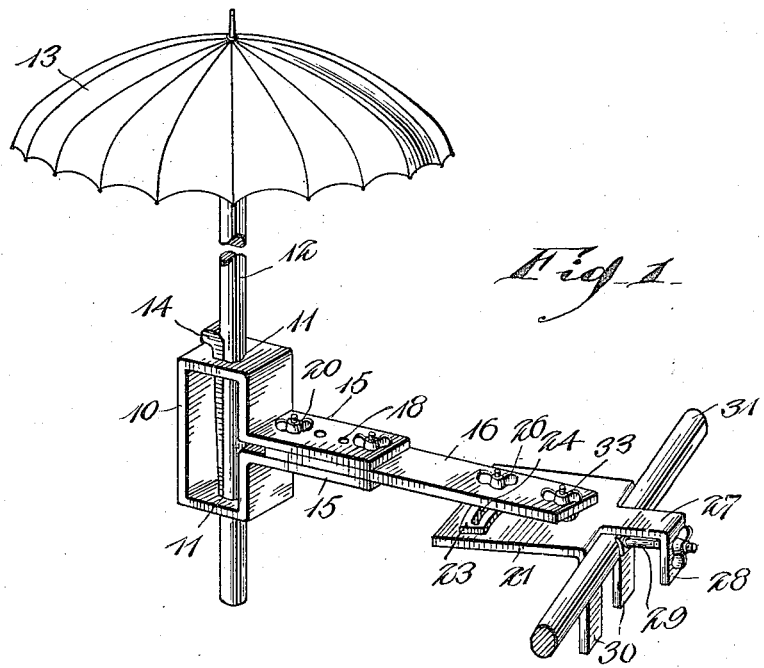
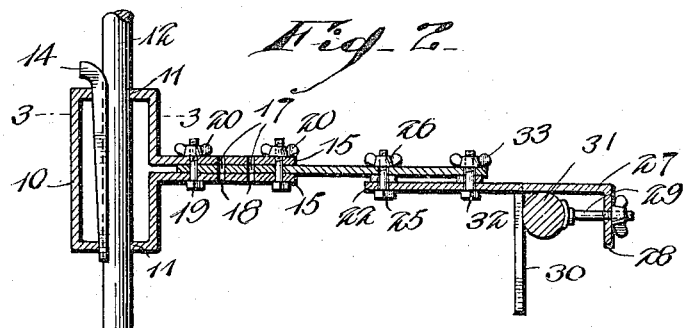
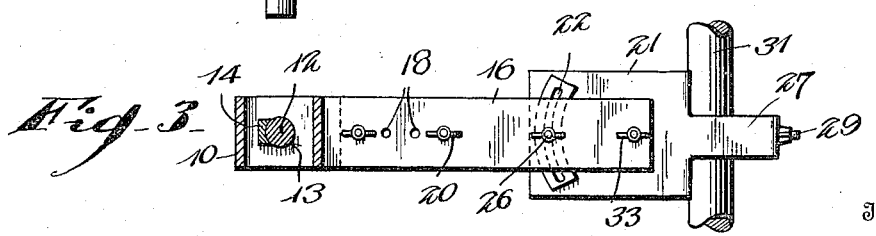

UNITED STATES PATENT OFFICE.

CLEMENS HOHL AND DENNIS BALDWIN, OF GREEN RIVER, UTAH.

UMBRELLA-SUPPORTING DEVICE.

1,162,608. Specification of Letters Patent. Patented Nov. 30, 1915.

Application filed November 8, 1913. Serial No. 800,004.

*To all whom it may concern:*

Be it known that we, CLEMENS HOHL and DENNIS BALDWIN, citizens of the United States, residing at Green River, in the county of Emery and State of Utah, have invented new and useful Improvements in Umbrella-Supporting Devices, of which the following is a specification.

An object of the invention is to provide a simple and effective device for supporting an umbrella.

The invention embodies, among other features, the provision of a device for attachment to vehicles and the like and which is adapted to carry and support an umbrella in position to shade and protect the driver of the vehicle.

It will be understood, however, that our device can also be employed on rigid structures.

In the further disclosure of the invention reference is to be had to the accompanying drawings, constituting a part of this specification, in which similar characters of reference denote corresponding parts in all the views, and in which:

Figure 1 is a perspective view of the device showing an umbrella supported thereby; Fig. 2 is a vertical longitudinal sectional view of the structure disclosed in Fig. 1, the body of the umbrella being broken away; and Fig. 3 is a horizontal sectional view taken on the line 3—3 in Fig. 2.

Referring more particularly to the views, we provide a substantially rectangular socket 10 having a plurality of openings 11 therein and through which is adapted to extend the stem 12 of an umbrella 13, a wedge-like securing member 14 being also adapted to project through the openings 11 and engage the stem 12 to rigidly hold the stem in an adjusted position on the socket 10, as will be readily apparent by referring to the views, the inner face of the member 14 being preferably curved to conform to the curvature of the stem.

The ends of the socket 10 extend laterally to the body of the socket and are spaced apart to receive therebetween the outer end of a bar 16, the said bar having a series of transverse openings 17 adapted to register with a series of openings 18 formed in the ends 15 of the socket 10, bolts 19 having suitable thumb nuts 20 being adapted to pass through the registering openings 17 and 18 in order to secure the bar 16 between the ends 15 of the socket 10 and also permit of adjusting the bar relatively to the socket, as will be clearly apparent by referring to the views.

The inner end of the bar 16 is arranged to swing horizontally on a plate 21 having a segmental slot 22 therein, a segmentally shaped seat member 23 being formed with or secured to the plate 21 and having a segmental slot 24 registering with the slot 22, with the inner end of the bar 16 reposing on the said seat and slidable horizontally thereon in view of the pivotal connection of the bar 16 with the plate 21. A bolt 25 passes through the slots 22 and 24 and carries a thumb nut 26 which can be screwed up on the bolt and engage the face of the bar 16 to rigidly lock the bar relatively to the plate 21 after the bar has been swung to the desired horizontal position relatively to the plate. The plate 21 has the rear end thereof terminating in a rearwardly projecting tongue 27 having a lateral flange 28 carrying a clamping member 29 and the said plate also includes a plurality of depending auxiliary plates 30 arranged so that when it is desired to clamp the plate 21 to a cross piece 31 the cross piece will be received between the clamping member 29 and the auxiliary plates 30 and abut against the same, after which the clamping member 29 is moved into engagement with the cross piece 31 to clamp the same rigidly against the auxiliary plates 30 as shown, thus supporting the plate 21 in a horizontal position and, therefore, through the medium of the bar 16 and the socket 10, holding the umbrella 13 in an upright position as shown.

In order that our device can be readily taken apart when not in use, the pivotal connection between the bar 16 and the plate 21 consists of a bolt 32 passing through the plate and the bar and carrying a thumb nut 33 which can be screwed down on the bolt to engage the upper face of the bar 16 to aid in rigidly clamping the bar 16 in a desired position relatively to the plate 21 and also permit of disengaging the bar from the plate when it is desired to disassemble the device.

It will be understood that our umbrella supporting device can be used in connection with rigid structures such as buildings, window casings or ledges, although the same is preferably adapted for use on vehicles and the like, and whereby it is desired to employ a device for supporting an umbrella in a desired position to protect the driver of the vehicle.

Having thus described our invention, we claim:

In an umbrella supporting device, the combination with a socket through which the stem of the umbrella is adapted to extend, said socket having a plurality of spaced projecting portions, of means for securing the stem of the umbrella in the socket, a horizontal bar connecting with the socket, means for securing the socket in adjusted position relatively to the bar, said bar having an end lying between the spaced projecting portions of the socket, a horizontal plate provided with a segmental slot and having the inner end of the bar mounted to swing thereon, means carried by the bar and projecting through the segmental slot whereby the bar can be secured in an adjusted position on the plate, a plurality of spaced members formed with the plate and adapted to receive a support therebetween, and means movably supported on one of the members and adapted to engage the support to hold the plate thereon.

In testimony whereof we affix our signatures in presence of two witnesses.

CLEMENS HOHL.
DENNIS BALDWIN.

Witnesses:
B. F. MILLER,
A. G. WIMMER.

Copies of this patent may be obtained for five cents each, by addressing the "Commissioner of Patents, Washington, D. C."